(12) United States Patent
Ohnishi

(10) Patent No.: US 9,733,877 B2
(45) Date of Patent: Aug. 15, 2017

(54) INFORMATION PROCESSING APPARATUS, JOB-PROCESS CONTROL METHOD, AND JOB-PROCESS CONTROL COMPUTER PROGRAM PRODUCT BASED ON PROHIBITION DATA AND PROHIBITION RULE DATA

(71) Applicant: Kazuki Ohnishi, Tokyo (JP)

(72) Inventor: Kazuki Ohnishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/086,311

(22) Filed: Nov. 21, 2013

(65) Prior Publication Data

US 2014/0139880 A1 May 22, 2014

(30) Foreign Application Priority Data

Nov. 22, 2012 (JP) .................................. 2012-256855

(51) Int. Cl.
*G06F 3/12* (2006.01)

(52) U.S. Cl.
CPC ............ *G06F 3/1255* (2013.01); *G06F 3/121* (2013.01); *G06F 3/1275* (2013.01); *G06F 3/1285* (2013.01)

(58) Field of Classification Search
None
See application file for complete search history.

(56) References Cited

U.S. PATENT DOCUMENTS

| 7,408,674 | B2 * | 8/2008 | Moro et al. .................. 358/1.13 |
| 9,213,508 | B2 * | 12/2015 | Sueshige ............... G06F 3/1244 |
| 2001/0055123 | A1 * | 12/2001 | Ryan ...................... G06Q 10/06 358/1.12 |
| 2002/0018235 | A1 * | 2/2002 | Ryan ...................... G06Q 10/06 358/1.15 |
| 2002/0065807 | A1 * | 5/2002 | Kawamoto ........... G06F 3/1205 |
| 2002/0161936 | A1 * | 10/2002 | Minagawa ........... G06K 15/002 710/1 |
| 2003/0053106 | A1 * | 3/2003 | Kuroda et al. ............... 358/1.13 |
| 2003/0053129 | A1 * | 3/2003 | Morooka .............. G06F 3/1205 358/1.15 |
| 2004/0136023 | A1 * | 7/2004 | Sato ............................ 358/1.13 |

(Continued)

FOREIGN PATENT DOCUMENTS

| JP | 2000-242597 A | 9/2000 |
| JP | 2009-163574 A | 7/2009 |

(Continued)

OTHER PUBLICATIONS

Office Action issued on Aug. 2, 2016 in Japanese Patent Application No. 2012-256855.

*Primary Examiner* — Nicholas Pachol

(74) *Attorney, Agent, or Firm* — Oblon, McClelland, Maier & Neustadt, L.L.P.

(57) ABSTRACT

An information processing apparatus includes: a reception unit that receives a job; a prohibition process unit that performs a prohibition process on the job; a process decision unit that decides a handling process at a time of a prohibition violation based on predetermined process rule data; and a job-process control unit that, when a determination result of the prohibition process indicates the prohibition violation, controls a process of the job according to the decided handling process.

6 Claims, 9 Drawing Sheets

(56) References Cited

U.S. PATENT DOCUMENTS

| | | | | |
|---|---|---|---|---|
| 2004/0216144 A1* | 10/2004 | Mitsui | G06F 3/1205 | 719/321 |
| 2004/0257604 A1* | 12/2004 | Morooka | G06F 3/1204 | 358/1.14 |
| 2005/0157315 A1* | 7/2005 | Kato | G06F 3/1204 | 358/1.1 |
| 2005/0286100 A1* | 12/2005 | Uotani et al. | | 358/527 |
| 2006/0082802 A1* | 4/2006 | Furuya | | 358/1.13 |
| 2006/0103868 A1* | 5/2006 | Mitsui | | 358/1.13 |
| 2006/0103869 A1* | 5/2006 | Kato | G06F 3/1204 | 358/1.13 |
| 2006/0209330 A1* | 9/2006 | Mitsui | | 358/1.13 |
| 2007/0171454 A1* | 7/2007 | Takahashi | B42B 4/00 | 358/1.14 |
| 2008/0144087 A1* | 6/2008 | Mitsui | G06F 3/1204 | 358/1.15 |
| 2008/0187346 A1* | 8/2008 | Kato | | 358/1.13 |
| 2008/0246992 A1* | 10/2008 | Yamamichi | | 358/1.15 |
| 2008/0266598 A1* | 10/2008 | Ozaki | | 358/1.15 |
| 2009/0103128 A1* | 4/2009 | Maeda | | 358/1.15 |
| 2009/0180140 A1* | 7/2009 | Kawamura | | 358/1.15 |
| 2009/0201540 A1* | 8/2009 | Morooka | | 358/1.15 |
| 2009/0237732 A1* | 9/2009 | Kuroda et al. | | 358/1.15 |
| 2010/0046048 A1* | 2/2010 | Uotani et al. | | 358/527 |
| 2010/0188680 A1* | 7/2010 | Xiao | | 358/1.13 |
| 2011/0002006 A1 | 1/2011 | Toriumi | | |
| 2011/0107432 A1* | 5/2011 | Oomori | | 726/27 |
| 2011/0116131 A1* | 5/2011 | Mitsui | G06F 3/1205 | 358/1.15 |
| 2011/0170926 A1* | 7/2011 | Kizaki et al. | | 400/76 |
| 2012/0050782 A1* | 3/2012 | Kawasaki | | 358/1.14 |
| 2012/0050803 A1* | 3/2012 | Ebuchi et al. | | 358/1.15 |
| 2012/0154844 A1* | 6/2012 | Kuroda et al. | | 358/1.13 |
| 2012/0176632 A1* | 7/2012 | Katano et al. | | 358/1.9 |
| 2012/0224207 A1* | 9/2012 | Sueshige | | 358/1.13 |
| 2012/0320395 A1* | 12/2012 | Kuroda et al. | | 358/1.9 |
| 2013/0088729 A1* | 4/2013 | Fu | H04N 1/60 | 358/1.9 |

FOREIGN PATENT DOCUMENTS

| JP | 2011-034553 | 2/2011 |
|---|---|---|
| JP | 2011-118475 | 6/2011 |

\* cited by examiner

| DEVICE NAME | FUNCTION NAME | |
|---|---|---|
| PRINTER A | COLOR PRINTING | MONOCHROME PRINTING |
| | SHEET-SIZE MIXED PRINTING | AGGREGATE PRINTING |
| ... | ... | ... |

(b)

91D₂

| FUNCTION NAME | DEVICE NAME | |
|---|---|---|
| STAPLING | PRINTER A | STAPLER |
| PUNCHING | PRINTER A | PUNCHER |
| ... | ... | ... |

(c)

91D₃

| PROCESS ORDER | FUNCTION NAME | | |
|---|---|---|---|
| 1 | STAPLING | PUNCHING | ... |
| 2 | PUNCHING | STAPLING | ... |

| PROHIBITION VIOLATION TYPE | HANDLING PROCESS CONTENTS |
|---|---|
| DEVICE/ FUNCTION VIOLATION | UPDATE OPERATION CONTROL CONDITION BY DEFAULT VALUE OF USED DEVICE AND/OR USED FUNCTION AND THEN RESTART JOB PROCESS |
| INTER-FUNCTION VIOLATION | UPDATE OPERATION CONTROL CONDITION BY CONTROL VALUE DEFINED IN ADVANCE AND THEN RESTART JOB PROCESS |
| INTER-DEVICE VIOLATION | PERFORM ERROR NOTIFICATION (UI DISPLAY) |
| PROCESS ORDER VIOLATION | CANCEL JOB |

INFORMATION PROCESSING APPARATUS, JOB-PROCESS CONTROL METHOD, AND JOB-PROCESS CONTROL COMPUTER PROGRAM PRODUCT BASED ON PROHIBITION DATA AND PROHIBITION RULE DATA

CROSS-REFERENCE TO RELATED APPLICATIONS

The present application claims priority to and incorporates by reference the entire contents of Japanese Patent Application No. 2012-256855 filed in Japan on Nov. 22, 2012.

BACKGROUND OF THE INVENTION

1. Field of the Invention

The present invention relates to a technique for controlling a job process.

2. Description of the Related Art

In recent POD (Print On Demand), there has been provided a job-process control system that manages a process from editing to printing/binding as a workflow by an information processing apparatus. In such a job-process control system, a job process of the workflow is automatically controlled based on a job ticket having an operation control condition (a job parameter) of each processing step defined therein. However, according to the job-process control system, an operation control condition of a processing step that is defined in the job ticket sometimes does not match the capability of a machine or a function that performs a process (device specifications or function specifications), so that it may be impossible to perform the process. Therefore, conventionally, by performing a prohibition process disclosed in, for example, Japanese Patent Application Laid-open No. 2011-118475, an error (a prohibition violation) that a processing step set in a job cannot be performed is notified to an operator and the error can be eliminated by resetting.

However, according to conventional job-process control, an operator needs to manually eliminate an occurring prohibition violation (reset). Accordingly, the conventional job-process control has had problems that regardless of the prohibition violation type, a processing step of a workflow is interrupted for an operator operation for eliminating an error, so that the production efficiency of the entire system is reduced.

In view of the above, there is a need to provide an information processing apparatus, a job-process control method, and a job-process control computer program product that can enhance the productivity of a job process.

SUMMARY OF THE INVENTION

It is an object of the present invention to at least partially solve the problems in the conventional technology.

An information processing apparatus includes: a reception unit that receives a job; a prohibition process unit that performs a prohibition process on the job; a process decision unit that decides a handling process at a time of a prohibition violation based on predetermined process rule data; and a job-process control unit that, when a determination result of the prohibition process indicates the prohibition violation, controls a process of the job according to the decided handling process.

A job-process control method includes: a receiving step of receiving a job; a prohibition process step of performing a prohibition process on the job; a process decision step of deciding a handling process at a time of a prohibition violation based on predetermined process rule data; and a job-process control step of, when a determination result of the prohibition process indicates the prohibition violation, controlling a process of the job according to the decided handling process.

A job-process control computer program product includes a non-transitory computer-usable medium having computer-readable program codes embodied in the medium. The program codes when executed cause a computer to function as: a reception unit that receives a job; a prohibition process unit that performs a prohibition process on the job; a process decision unit that decides a handling process at a time of a prohibition violation based on predetermined process rule data; and a job-process control unit that, when a determination result of the prohibition process indicates the prohibition violation, controls a process of the job according to the decided handling process.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4A is an example of prohibition data according to the first embodiment;

FIG. 4B is an example of prohibition data according to the first embodiment;

FIG. 4C is an example of prohibition data according to the first embodiment;

FIG. 5 is an example of process rule data according to the first embodiment;

DETAILED DESCRIPTION OF THE PREFERRED EMBODIMENTS

Embodiments of an information processing apparatus, a job-process control method, and a job-process control computer program product will be explained below in detail with reference to the accompanying drawings.

First Embodiment

System Configuration

Figure 1:
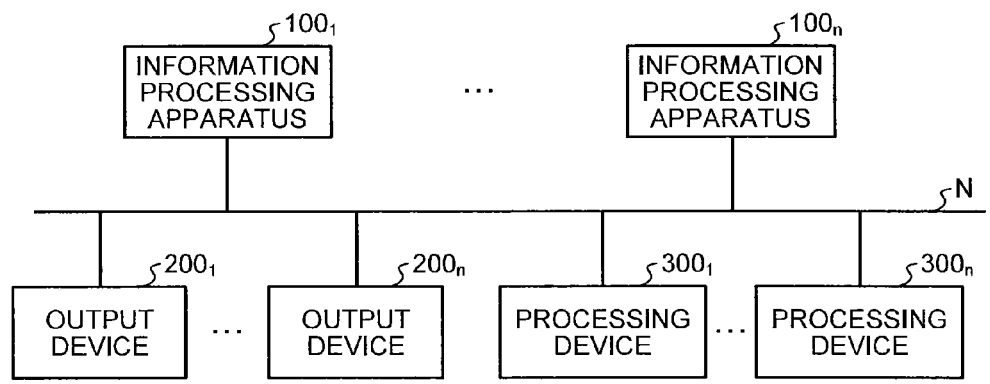
FIG. 1 is a configuration example of a job-process control system according to a first embodiment.

FIG. 1 is a configuration example of a job-process control system 1 according to the present embodiment. FIG. 1 is an example in which one or a plurality of information processing apparatuses $100_1$ to $100_n$, one or a plurality of output devices $200_1$ to $200_n$, and one or a plurality of processing devices $300_1$ to $300_n$ are connected to a predetermined data transmission path N (for example, "network"). The information processing apparatuses $100_1$ to $100_n$ may be collectively called "information processing apparatus 100", the output devices $200_1$ to $200_n$ may be collectively called "output device 200", and the processing devices $300_1$ to $300_n$ may be collectively called "processing device 300" below.

The information processing apparatus 100 is a device having an information processing function and is a PC (Personal Computer) or the like. The output device 200 is a device having an image information processing function and is a printer, an MFP (Multifunction Peripheral), or the like. The processing device 300 is a device having a post-processing function of shaping and processing a paper medium after print-outputting the paper medium, and is a stapler, a puncher, or the like.

The job-process control system 1 according to the present embodiment provides the following services. When the information processing apparatus 100 receives a job request, the information processing apparatus 100 performs a prohibition process on a requested job. At this time, in the information processing apparatus 100, the prohibition process is performed based on a predetermined prohibition condition.

Accordingly, when a processing step that is set in the job violates no prohibition, the information processing apparatus 100 transmits data of the job to the output device 200, the processing device 300, or the like that performs the next processing step of a workflow, and requests the device to perform a process. On the other hand, when the processing step that is set in the job violates a prohibition, the information processing apparatus 100 decides a method of a handling process for eliminating an error of an occurring prohibition violation. At this time, in the information processing apparatus 100, the processing method is decided based on a predetermined process rule. The information processing apparatus 100 then performs a job process according to the decided processing method.

Hardware Configuration

Figure 2:
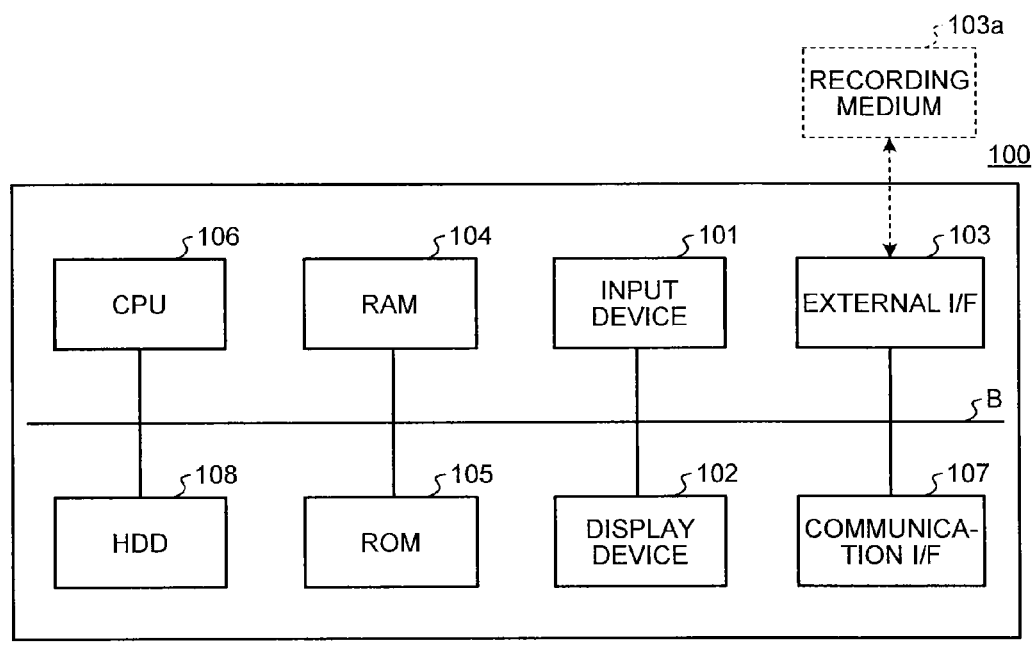
FIG. 2 is an example of a hardware configuration of an information processing apparatus according to the first embodiment.

FIG. 2 is an example of a hardware configuration of the information processing apparatus 100 according to the present embodiment. As shown in FIG. 2, the information processing apparatus 100 includes an input device 101, a display device 102, and an external I/F (Interface) 103. The information processing apparatus 100 also includes a RAM (Random Access Memory) 104, a ROM (Read Only Memory) 105, and a CPU (Central Processing Unit) 106. The information processing apparatus 100 further includes a communication I/F 107, and an HDD (Hard Disk Drive) 108. In the information processing apparatus 100, these components are connected to each other by a bus B.

The input device 101 includes a keyboard, a mouse, and/or the like and is used to input operating signals to the information processing apparatus 100. The display device 102 includes a display and displays a processing result of the information processing apparatus 100.

The communication I/F 107 is an interface that connects the information processing apparatus 100 to the data transmission path N. The information processing apparatus 100 can thus perform data communication with other devices via the communication I/F 107.

The HDD 108 is a non-volatile storage device that stores therein programs and data. The stored programs and data include an OS (Operating System) serving as basic software that controls the entire apparatus, and application software that provides various functions on the OS. The HDD 108 manages the stored programs and data by a predetermined file system and/or a DB (Data Base).

The external I/F 103 is an interface with an external device. The external device may be a recording medium 103a. The information processing apparatus 100 can thus perform a read and/or a write from/in the recording medium 103a via the external I/F 103. Examples of the recording medium 103a include a floppy® disk, a CD (Compact Disk), a DVD (Digital Versatile Disk), and a memory card.

The ROM 105 is a non-volatile semiconductor memory (a storage device) that can hold internal data even when a power supply is switched off. The ROM 105 stores therein programs and data such as a BIOS (Basic Input/Output System) that is executed at the time of activating the information processing apparatus 100, OS settings, and network settings. The RAM 104 is a volatile semiconductor memory that temporarily holds programs and data. The CPU 106 is a computation device that reads programs and data from the storage device as explained above (for example, "HDD" or "ROM") onto the RAM 104 and performs a process, thereby realizing control of the entire apparatus and installed functions.

As explained above, according to the present embodiment, with the configuration of the system and the hardware described above, a job-process control function of controlling a job process can be provided.

Job-Process Control Function

A job-process control function according to the present embodiment is explained.

When the information processing apparatus 100 according to the present embodiment receives a job request, the information processing apparatus 100 performs a prohibition process on a requested job based on a predetermined prohibition condition. When a processing step of the job violates a prohibition, the information processing apparatus 100 decides a handling method of an occurring prohibition violation based on a predetermined process rule. The information processing apparatus 100 performs a job process (a handling process of the prohibition violation) according to the decided processing method. The information processing apparatus 100 has such a job-process control function.

Conventional job-process control has had problems that regardless of the prohibition violation type, a processing-step of a workflow is interrupted for an operation by an operator for eliminating an error, so that the production efficiency of the entire system is reduced.

Therefore, the job-process control function according to the present embodiment is configured to control a job process after a prohibition violation, according to a process rule that is set in advance.

The job-process control function according to the present embodiment thus provides an environment that can reduce the frequency that a processing step of a workflow is interrupted for an operation by an operator for eliminating a prohibition violation. Consequently, the job-process control function according to the present embodiment enhances the productivity of a job process.

A configuration and operation of the job-process control function according to the present embodiment is explained below.

Figure 3:
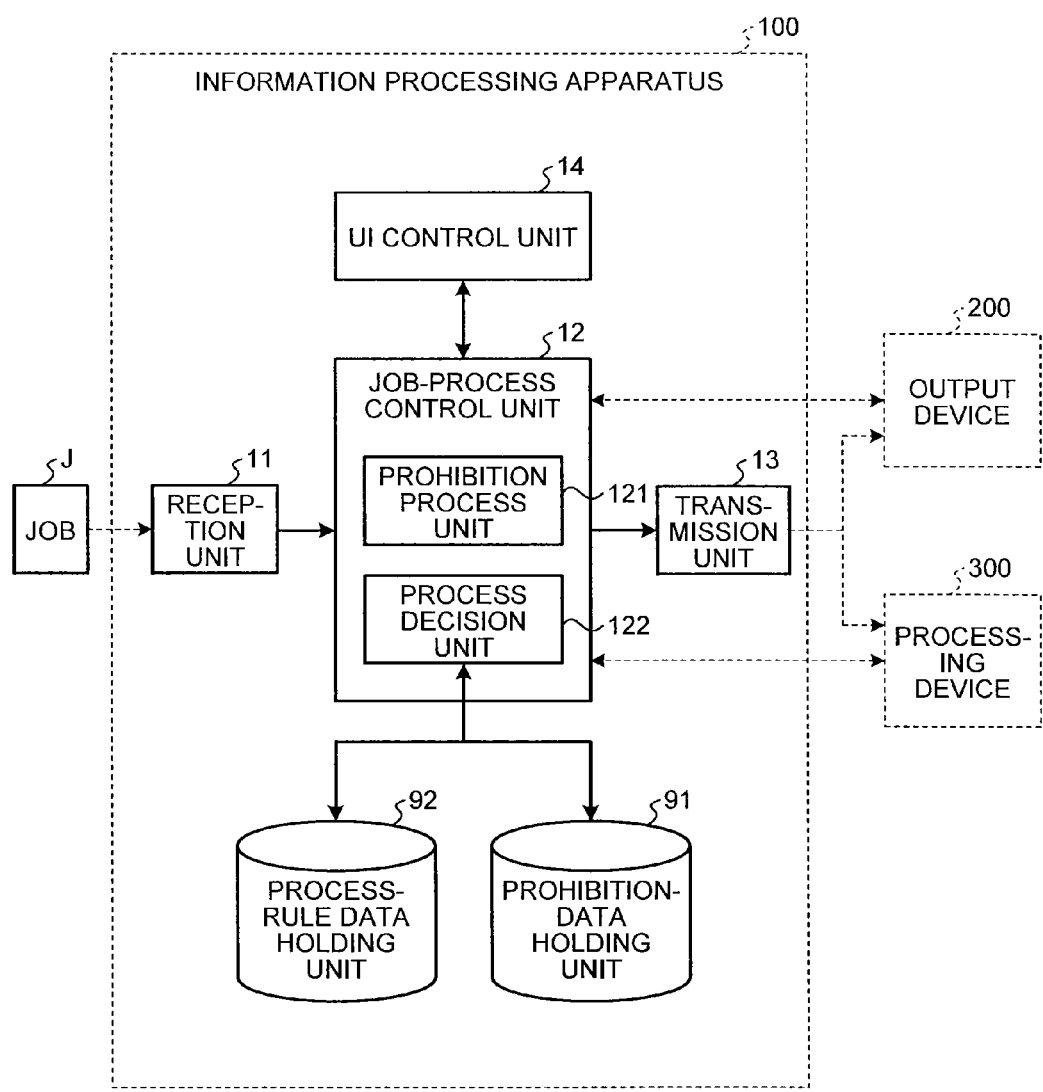
FIG. 3 is a configuration example of a job-process control function according to the first embodiment.

FIG. 3 is a configuration example of the job-process control function according to the present embodiment. As shown in FIG. 3, the job-process control function according to the present embodiment includes a reception unit 11, a job-process control unit 12, a transmission unit 13, and a UI (User Interface) control unit 14.

The reception unit 11 is a functional unit that receives a job J. The reception unit 11 receives the job J via the predetermined data transmission path N. The information processing apparatus 100 thus receives a job request. Data of the received job J includes process target data such as an image, and a job ticket. The job ticket includes job-process definition data in which a processing step and an operation control condition (a job parameter value) are defined based on a JDF (Job Definition Format).

The job-process control unit 12 is a functional unit that controls a request process of the received job J. The job-process control unit 12 includes a prohibition process unit 121, and a process decision unit 122.

The prohibition process unit 121 is a functional unit that performs a prohibition process on the job J. The prohibition process is a process of determining whether a processing step of the requested job J violates a prohibition (whether a processing step of the job J can be performed by a used device). When the information processing apparatus 100 receives a process request of the job J, the information processing apparatus 100 accesses a used device such as the output device 200 or the processing device 300 via a predetermined communication protocol (for example, "SNMP: Simple Network Management Protocol"). At this time, the information processing apparatus 100 acquires, for example, Devcaps data. The information processing apparatus 100 thus acquires information on a device and a function installed in the used device (hereinafter, "device/function information") and the like.

The prohibition process unit 121 determines whether the processing step of the requested job J can be performed by the used device based on the acquired device/function information of the used device and prohibition data having a prohibition condition defined therein. The prohibition data is recorded and held in a prohibition-data holding unit 91 corresponding to a predetermined storage area of a storage device such as the HDD 108. The prohibition data is explained below.

Prohibition Data

FIGS. 4A to 4C are an example of prohibition data 91D according to the present embodiment. For example, the prohibition data 91D that is set in advance include data 91D$_1$ (hereinafter, "inter-function prohibition data") that indicates the relationship of functions that need to be used exclusively with each another. The prohibition data 91D also includes data 91D$_2$ (hereinafter, "inter-device prohibition data") that indicates the relationship of devices that need to be used exclusively with each another. The prohibition data 91D further include data 91D$_3$ (hereinafter, "process-order prohibition data") that indicates a process order that needs to be prohibited from being used.

For example, the inter-function prohibition data 91D$_1$ has a data configuration that includes information items such as a device name and a function name and in which the relationship of functions that need to be used exclusively with each another can be set by associating item values of the respective information items with each other. FIG. 4A is a setting example of the relationship of functions that are used exclusively with each another in a printer A. Specifically, a prohibition condition in which a color printing function and a monochrome printing function cannot be simultaneously used in the same job process is set. A prohibition condition in which a sheet-size mixed printing function and an aggregate printing function cannot be simultaneously used in the same job process is also set.

For example, the inter-device prohibition data 91D$_2$ has a data configuration that includes information items such as a function name and a device name and in which the relationship of devices that need to be used exclusively with each another can be set by associating item values of the respective information items with each other. FIG. 4B is a setting example of the relationship of devices that need to be used exclusively with each another in a stapling function and a punching function. Specifically, a prohibition condition in which the printer A having the stapling function and a stapler cannot be simultaneously used in the same job process is set. The stapler is the processing device 300 that performs a stapling process alone. The setting of FIG. 4B means that a double stapling process by different used devices (performance of the same process for a plurality of times) is excluded. A prohibition condition in which the printer A having the punching function and a puncher cannot be simultaneously used in the same job process is also set. The puncher is the processing device 300 that performs a punching process alone. The setting of FIG. 4B means that a double punching process by different used devices is excluded.

For example, the process-order prohibition data 91D$_3$ has a data configuration that includes information items such as a process order and a function name and in which a process order that needs to be prohibited from being used can be set by associating item values of the respective information items with each other. FIG. 4C is a setting example of a process order regarding the stapling function and the punching function that is prohibited from being used. Specifically, prohibition conditions in which the punching process cannot be performed after stapling and the stapling process cannot be performed after punching are set.

For example, the prohibition data 91D as explained above can be set through a predetermined UI screen (not shown). The UI screen is created by the UI control unit 14 that is explained later and displayed on a display device (not shown).

Returning to the explanation of FIG. 3, the prohibition process unit 121 refers to job-process definition data of the job J to identify a used function that performs a defined process. The prohibition process unit 121 determines whether a processing step of the requested job J violates a prohibition based on the identified used function and the acquired device/function information. When the used device does not have the used function, the prohibition process unit 121 determines that the processing step cannot be performed and thus violates the prohibition.

Further, the prohibition process unit 121 refers to the job-process definition data of the job J to identify an operation control condition of the used device and/or the used function from a job parameter value. The prohibition process unit 121 accesses the prohibition-data holding unit 91 to determine whether the processing step of the requested job J violates the prohibition based on the identified operation control condition and the prohibition data 91D. When the operation control condition matches a prohibition condition, the prohibition process unit 121 determines that the processing step cannot be performed and thus violates the prohibition.

The process decision unit 122 is a functional unit that, when a processing step of the requested job J violates a prohibition, decides a method of a handling process for eliminating an error of the prohibition violation (hereinafter, "error-handling process at the time of a prohibition violation"). The process decision unit 122 decides an error-handling process at the time of a prohibition violation on the job J based on a prohibition determination result and process rule data having a method of a handling process defined therein. The process rule data is recorded and held in a process-rule data holding unit 92 corresponding to a predetermined storage area of a storage device such as the HDD 108. The process rule data is explained below.

Process Rule Data

FIG. 5 is an example of process rule data 92D according to the present embodiment. For example, the process rule data 92D has a data configuration that includes information items such as a prohibition violation type and handling process contents and in which a handling process for each prohibition violation can be set by associating item values of the respective information items with each other. FIG. 5 is a setting example of the association relationship (process rules) between prohibition violations and processing methods for the respective prohibition violations. Specifically, a process rule indicating that, at the time of a prohibition violation of a used device and/or a used function, an operation control condition should be updated by a default value of the used device and/or the used function, and then a job process should be restarted is set. A process rule indicating that, at the time of an inter-function prohibition violation, an operation control condition should be updated by a control value (a defined value) that is defined in advance and then a job process should be restarted is also set. A process rule indicating that, at the time of an inter-device prohibition violation, error notification should be performed by controlling a UI is set. Further, a process rule indicating that, at the time of a prohibition violation of a process order, a job should be canceled is set.

The process rule data 92D as explained above can be set, for example, through a predetermined UI screen (not shown). The UI screen is created by the UI control unit 14 that is explained later and displayed on a display device (not shown).

Returning to the explanation of FIG. 3, the process decision unit 122 accesses the process-rule data holding unit 92 to decide an error handling process at the time of a prohibition violation on the job J based on a prohibition determination result and the process rule data 92D. As a result, the job-process control unit 12 thus controls a request process of the job J according to the decided processing method.

For example, the job-process control unit 12 refers to job-process definition data of the job J to update a job parameter value by a default value of a used device and/or a used function or a control value that is defined in the process rule data 92D, and issues instructions to restart a job process. Alternatively, the job-process control unit 12 refers to the job-process definition data of the job J to give an instruction to perform notification of error information including information that prompts handling of an error. Alternatively, the job-process control unit 12 discards received data of the requested job J and cancels the job.

The transmission unit 13 is a functional unit that transmits the job J. The transmission unit 13 transmits the job J to a used device via the predetermined data transmission path N. The information processing apparatus 100 thus requests the output device 200, the processing device 300, or the like to perform a job process. The transmitted data of the job J include process target data such as an image, job-process definition data in which a job parameter value is updated according to a process rule.

The UI control unit 14 is a functional unit that controls creation/displaying of a screen. The UI control unit 14 creates and displays an information notification screen to an operator, a UI screen that allows the operator to perform an operation, and/or the like. For example, the UI control unit 14 creates an information notification screen indicating that a prohibition violation occurs and displays the screen on a display device. Further, the UI control unit 14 creates a UI screen in which a job parameter value is editable so that an occurring prohibition violation is eliminated (a processing step of the job J can be performed by a used device), and displays the UI screen on a display device. The UI control unit 14 also creates a UI screen in which item values of the respective information items of the prohibition data 91D, the process rule data 92D, and the like are editable, and displays the UI screen on the display device.

As explained above, the job-process control function according to the present embodiment is realized by executing a job-process control program in the information processing apparatus 100 and by the functional units as explained above cooperating with each other.

The job-process control program is recorded as a file in an installable or executable format in the recording medium 103*a* that is readable by the information processing apparatus 100 serving as an execution environment, and provided thereto. The job-process control program has a module configuration including the respective functional units as explained above. By the CPU 106 reading the program from the recording medium 103*a* and executing the program, the respective functional units are generated on the RAM 104. A method of providing the job-process control program is not limited thereto. For example, the job-process control program can be stored in a device connected to the Internet or the like and downloaded via a network. Alternatively, the job-process control program can be installed in a storage device such as the ROM 105 in advance and provided.

A process at the time of executing the job-process control program (a cooperative operation of the respective functional units) is explained below with reference to a flowchart.

Basic Process of Job-Process Control

Figure 6:
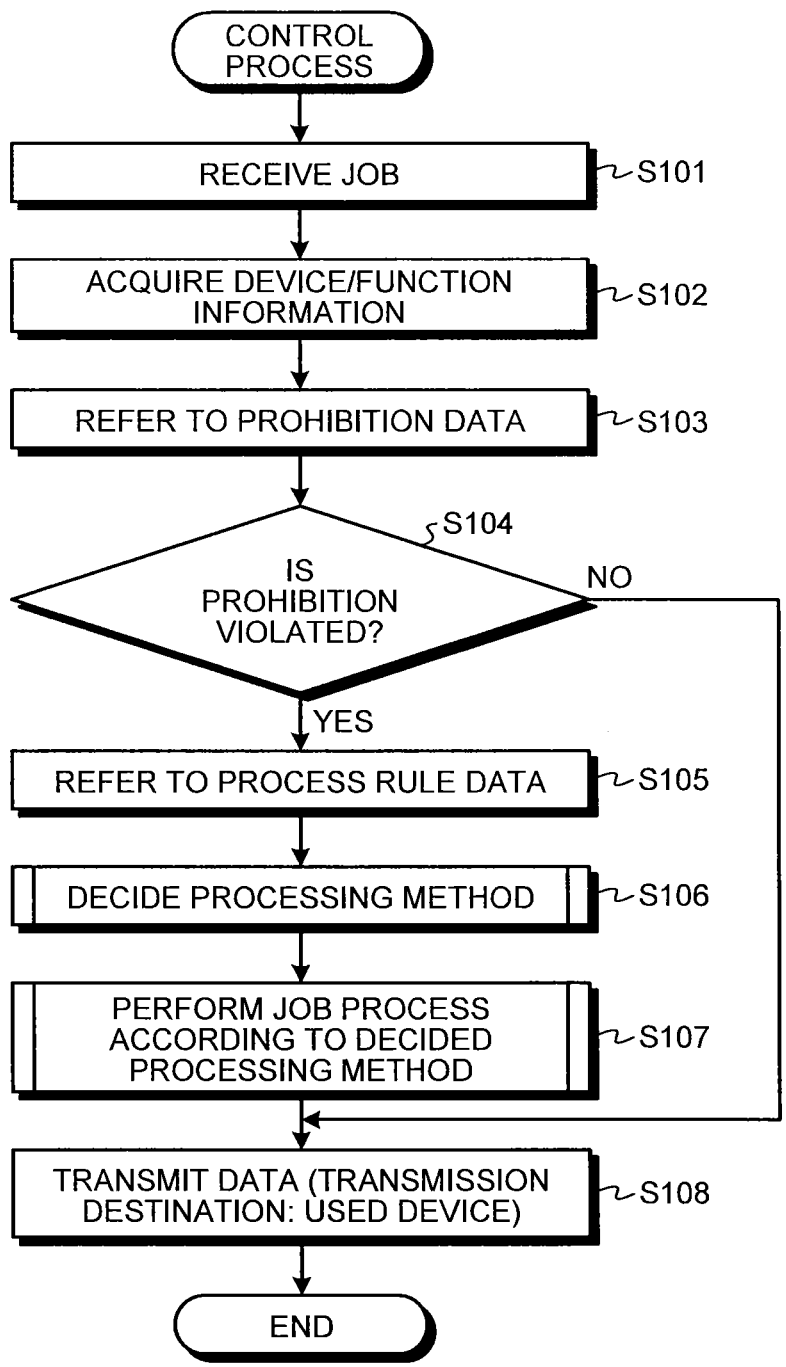
FIG. 6 is a flowchart of an example of a process procedure at the time of job-process control according to the first embodiment.

FIG. 6 is a flowchart of an example of a process procedure at the time of job-process control according to the present embodiment. As shown in FIG. 6, the reception unit 11 receives data of the job J (Step S101). The reception unit 11 receives data such as process target data and a job ticket via the predetermined data transmission path N, thereby receiving a job request.

Next, the job-process control unit 12 acquires device/function information from a used device such as the output device 200 and/or the processing device 300 via a predetermined communication protocol (Step S102). At this time, the job-process control unit 12 accesses the used device to acquire Devcaps data, thereby acquiring the information on the device/function installed in the used device.

Next, in the job-process control unit 12, the prohibition process unit 121 accesses the prohibition-data holding unit 91 to refer to the prohibition data 91D (Step S103). The prohibition process unit 121 determines whether a processing step of the requested job J violates a prohibition (whether a processing step of the job J can be performed by the used device) based on the acquired device/function information of the used device and the prohibition data 91D (Step S104). Specifically, the prohibition process unit 121 identifies a settable information item of an operation control condition from the device/function information, and determines a device/function prohibition violation based on a determination result whether a parameter value of the job J can be set in the information item. Further, the prohibition process unit 121 identifies a determination condition (a prohibition condition) for each prohibition violation from the prohibition data 91D, and determines an inter-function prohibition violation, an inter-device prohibition violation, or a process-order prohibition violation based on a determination result whether the job parameter value of the job J corresponds to the determination condition. In this way, according to the present embodiment, the device/function prohibition violation, the inter-function prohibition violation, the inter-device prohibition violation, and the process-order prohibition violation are determined.

In the job-process control unit 12, when a processing step of the requested job J violates a prohibition as a result (YES at Step S104), the process decision unit 122 accesses the process-rule data holding unit 92 to refer to the process rule data 92D (Step S105). The process decision unit 122 decides a method of an error handling process at the time of a prohibition violation based on a prohibition determination result and the process rule data 92D (Step S106). Specifically, the process decision unit 122 identifies the prohibition violation type from the prohibition determination result. The process decision unit 122 identifies an error handling process from an item value of a handling process contents item that is set in association with a prohibition violation type item in the process rule data 92D, based on the identified prohibition violation type.

The job-process control unit 12 performs a job process according to the decided processing method (Step S107).

Next, the transmission unit 13 transmits the data of the job J to the used device (Step S108). The transmission unit 13 transmits the data of the job J such as the process target data and the job ticket having a job parameter value updated according to a process rule, via the predetermined data transmission path N, and requests the output device 200 and/or the processing device 300 to perform a job process.

When the processing step of the requested job J violates no prohibition (NO at Step S104), the job-process control unit 12 needs not to decide the processing method and to perform a job process according to the decided processing method (Steps S105 to S107) as explained above. Accordingly, in the job-process control unit 12, the process of Steps S105 to S107 as explained above is skipped.

In this way, the job-process control function according to the present embodiment can control a job process after a prohibition violation according to a process rule that is set in advance.

A control process after a prohibition determination as explained above (the process of Steps S106 and S107) is explained in detail below with reference to a flowchart.

Detailed Process After Prohibition Determination

Figure 7:
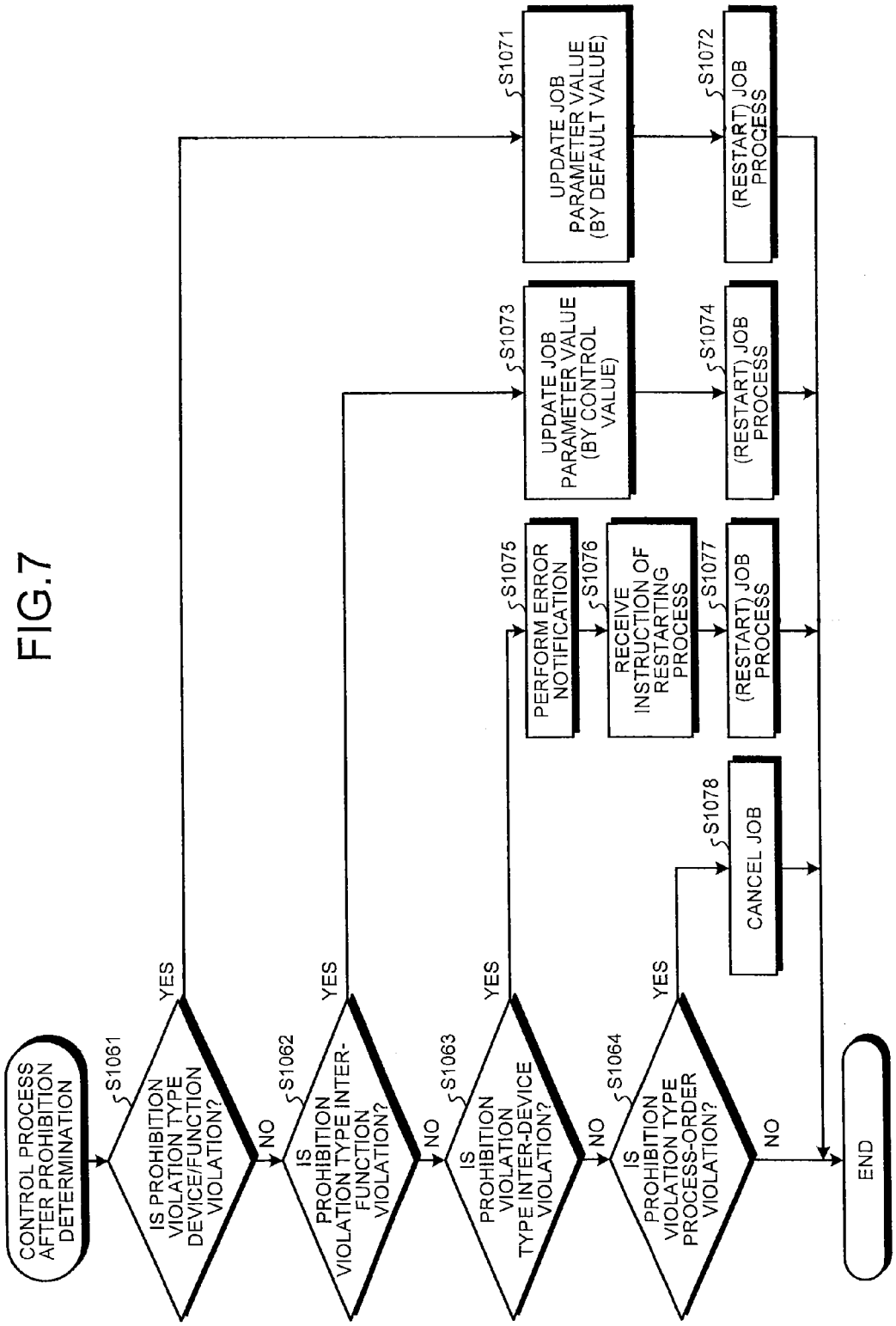
FIG. 7 is a flowchart of an example of a process procedure after a prohibition determination according to the first embodiment.

FIG. 7 is a flowchart of an example of a process procedure after a prohibition determination according to the present embodiment. As shown in FIG. 7, when the determined prohibition violation type is a device/function prohibition violation (YES at Step S1061), the process decision unit 122 decides on a method of restarting a job process after updating a job parameter as an error-handling process at the time of a prohibition violation. As a result, the job-process control unit 12 updates a job parameter value serving as an operation control condition by a default value of a used device and/or a used function based on the decided processing method (Step S1071). The job-process control unit 12 then instructs a used device to restart a job process (Step S1072).

When the determined prohibition violation type is an inter-function prohibition violation (NO at Step S1061, YES at Step S1062), the process decision unit 122 decides on the method of restarting a job process after updating a job parameter as the error-handling process at the time of a prohibition violation. As a result, the job-process control unit 12 updates the job parameter value serving as an operation control condition by a control value that is defined in advance in a process rule according to the decided processing method (Step S1073). The job-process control unit 12 then instructs a used device to restart a job process (Step S1074).

When the determined prohibition violation type is an inter-device prohibition violation (NO at Step S1062, YES at Step S1063), the process decision unit 122 decides on a method of notifying an operator of an error as the error-handling process at the time of a prohibition violation. As a result, the UI control unit 14 creates an information notification screen that indicates that a prohibition violation occurs and displays the screen on a display device, thereby performing error notification (Step S1075). At this time, the job-process control unit 12 instructs the UI control unit 14 to perform error notification according to the decided processing method.

When the job-process control unit 12 then receives an instruction to restart a job process from the operator through a display screen (Step S1076), the job-process control unit 12 instructs a used device to restart the job process (Step S1077). At this time, the UI control unit 14 transmits information about an operator operation received through the display screen (for example, "update value of job parameter" or "event value of restart of job process") to the job-process control unit 12. A process based on the operator operation is thus performed in the job-process control unit 12.

When the determined prohibition violation type is a process-order prohibition violation (NO at Step S1063, YES at Step S1064), the process decision unit 122 decides on a method of canceling a job as the error-handling process at the time of a prohibition violation. As a result, the job-process control unit 12 discards the data of the job J and cancels the job according to the decided processing method (Step S1078).

According to the job-process control function of the present embodiment, a device that manages a workflow decides a handling process according to an occurring prohibition violation and performs the process, so that the frequency that a processing step of the workflow is interrupted can be reduced.

In some prohibition violations, errors need not to require an operator to take the trouble to handle it. Such violations include a device/function prohibition violation, an inter-function prohibition violation, and an inter-device prohibition violation. According to these prohibition violations, errors are handled by changing an operation control condition of a processing step. Therefore, at the time of occurrence of these prohibition violations, the violations can be handled by a device that manages a workflow by deciding in advance a predetermined process rule regarding what value an operation control condition should be changed to. According to the job-process control function of the present embodiment, an error-handling process at the time of a prohibition violation is performed by a device that manages a workflow, so that the frequency that a processing step of the workflow is interrupted is reduced.

Summary

As explained above, according to the information processing apparatus 100 of the present embodiment, when the reception unit 11 receives a job request, the prohibition process unit 121 of the job-process control unit 12 performs a prohibition process on a requested job based on a predetermined prohibition condition. In the information processing apparatus 100, when a processing step of the job violates a prohibition, the process decision unit 122 of the job-process control unit 12 decides a handling method of an occurring prohibition violation based on a predetermined process rule. As a result, the job-process control unit 12 performs a job process (a handling process of the prohibition violation) according to the decided processing method.

The information processing apparatus 100 according to the present embodiment provides an environment that can reduce the frequency that a processing step of a workflow is interrupted for an operator operation for eliminating a prohibition violation. Therefore, in the information processing apparatus 100 according to the present embodiment, the productivity of a job process can be enhanced.

While the present embodiment has explained the job-process control function having the functional configuration as shown in FIG. 3, it is not limited thereto. For example, a configuration having a notification unit 15 as shown in FIG. 8 may be employed.

First Modification

Figure 8:
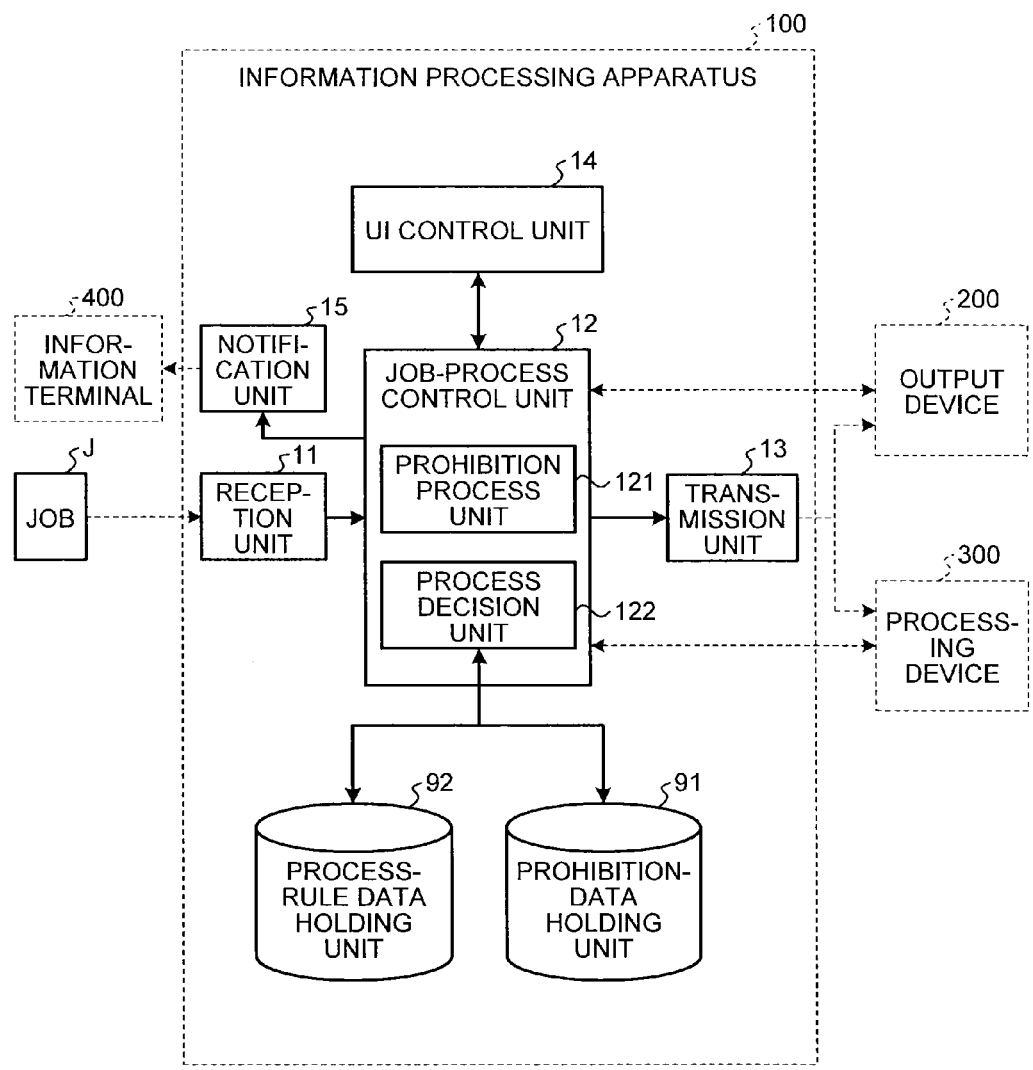
FIG. 8 is a configuration example of a job-process control function according to a first modification.

FIG. 8 is a configuration example of a job-process control function according to a first modification. The notification unit 15 is a functional unit that notifies a device of information relating to a job process. The notification unit 15 notifies an external device such as an information terminal 400 of information via, for example, wireless communication. The notified information includes information that a prohibition violation occurs, and information that indicates progress of a job process.

For example, the notification unit 15 notifies an external device of information about a job process based on notification destination information that is received at the time of receiving a request of the job process. Examples of the notification destination information include an e-mail address of a job-process requester, and a network identifier (IP address: Internet Protocol Address) of the information terminal 400. The notification destination information may be registered in advance in the information processing apparatus 100 (one or a plurality of notification destinations are registered), instead of being received at the time of receiving the request of the job process, and an information notification process may be performed based on the registered information.

In this way, according to the job-process control function of the first modification, by notifying the information terminal 400 having high portability of interruption of a processing step of a workflow, even when an operator in charge is absent, other notified operators can handle the interruption rapidly. Therefore, in the job-process control function according to the first modification, a reduction in the production efficiency of a job process can be suppressed.

While the abovementioned embodiment has explained the job-process control function that has the functional configuration in which the information processing apparatus 100 includes the process-rule data holding unit 92 as shown in FIG. 3, it is not limited thereto. For example, a configuration shown in FIG. 9 may be employed.

Second Modification

Figure 9:
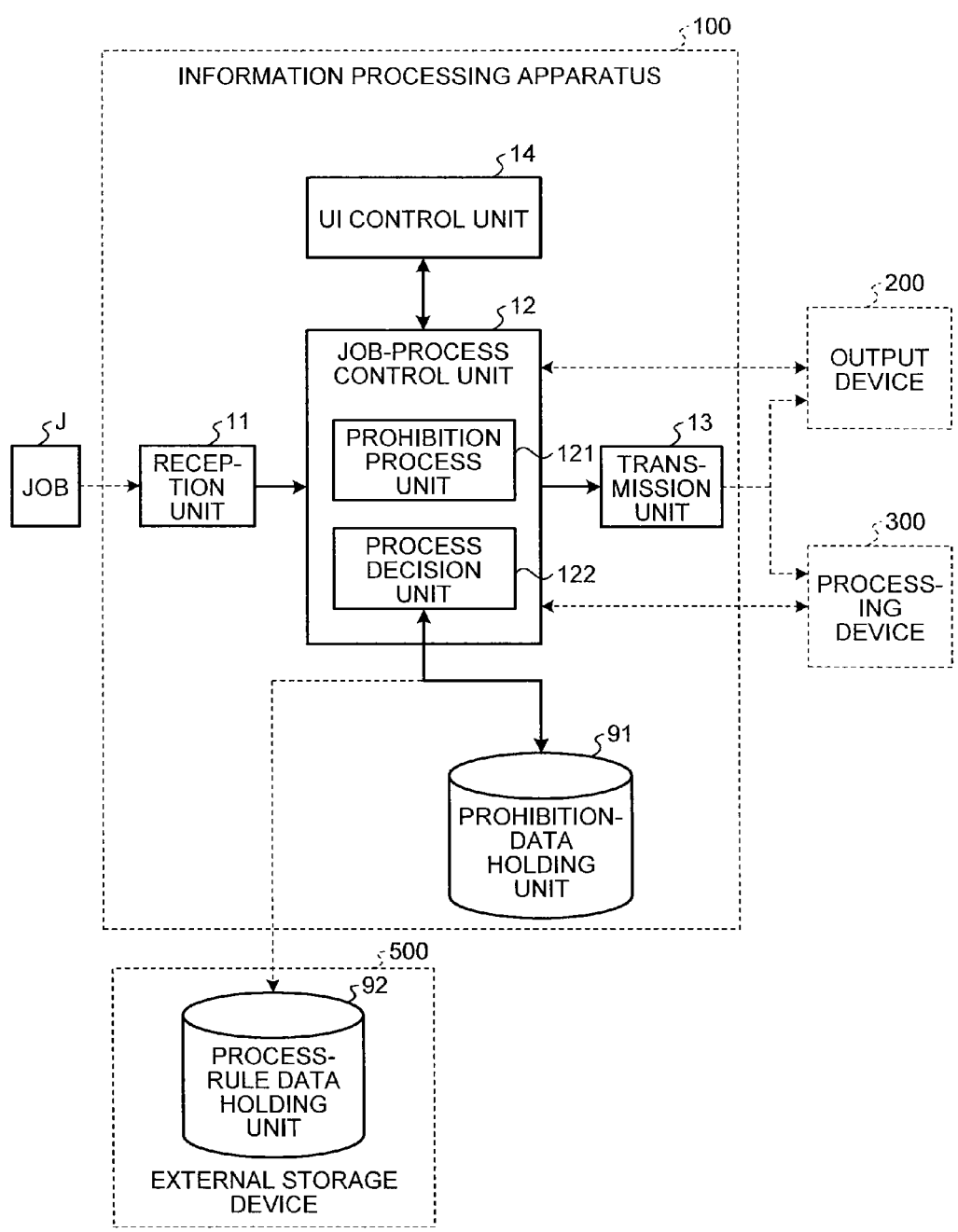
FIG. 9 is a configuration example of a job-process control function according to a second modification.

FIG. 9 is a configuration example of a job-process control function according to a second modification. FIG. 9 is a configuration example in which an external storage device 500 includes the process-rule data holding unit 92. In such a case, the job-process control unit 12 accesses the process-rule data holding unit 92 via a data transmission path that connects the information processing apparatus 100 to the external storage device 500 to refer to the process rule data 92D. Examples of the external storage device 500 include a storage device that is connected to the information processing apparatus 100 via a network, and the recording medium 103a that is connected to the information processing apparatus 100 via the external I/F 103 included in the information processing apparatus 100.

In this way, according to the job-process control function of the second modification, the process rule data 92D is held in an external storage area, so that setting/changing of a process rule or application of a new process rule can be easily performed and thus application of a process rule is made easy.

While the abovementioned embodiment has explained a data example of the process rule data 92D in which a method of an error handling process is defined for each prohibition violation, it is not limited thereto. For example, in the process rule data 92D, a method of an error handling process at the time of a prohibition violation can be defined for each user or for each type of the job J. It suffices that determination criteria (for example, "priority") for deciding a process from a plurality of error-handling process candidates at the time of the prohibition violation and the process contents based on the determination criteria are defined in the process rule data 92D.

According to the embodiment, the productivity of a job process can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus, comprising:
   a reception circuit that receives a job;
   a user interface control circuit that controls display of a user interface and receives, via the user interface, a user input from a user to set process rule data;
   a prohibition processing circuit that performs a prohibition process on the job based on at least two different relationships out of:
      a relationship between a function necessary for a process of the job and functions of first and second processing machines,
      a relationship between the functions of the first and second processing machines,
      a relationship between use of the first processing machine and use of the second processing machine,
      a process order of functions performed by the first and second processing machines, and
      a relationship between the process order of the first and second processing machines and a process order in which usage is to be prohibited;
   a process decision circuit that decides a handling process at a time of a prohibition violation based on the process rule data set by the user; and
   a job-process control circuit that, when a determination result of the prohibition process indicates the prohibition violation, controls a process of the job according to the handling process decided by the process decision circuit, wherein
   the process decision circuit decides the handling process for each prohibition violation based on the process rule data in which a type of the prohibition violation and the handling process at a time of the prohibition violation are set in association with each other,
   the job-process control circuit updates, when a prohibition violation of a used device or a used function occurs and the process rule data set by the user includes a user-defined handling process, an operation control condition in a processing step of the job according to the user-defined handling process and restarts a process of the job according to the user-defined handling process, and the job-process control circuit updates, when the prohibition violation of the used device or the used function occurs and the process rule data does not include the user-defined handling process, the operation control condition in the processing step of the job by a default value of the used device or the used function that performs the process of the job, and restarts the process of the job, according to the decided handling process.

2. The information processing apparatus according to claim 1, wherein the job-process control circuit updates an operation control condition in a processing step of the job by a control value that is defined in advance in the process rule data, and restarts a process of the job, according to the decided handling process.

3. The information processing apparatus according to claim 1, wherein the job-process control circuit discards data of the received job and cancels the job, according to the decided handling process.

4. A non-transitory computer-readable storage medium including a program stored thereon, which, when executed by a computer including circuitry, causes the computer to:
receive a job;
control display of a user interface;
receive, via the user interface, a user input from a user to set process rule data;
perform a prohibition process on the job based on at least two different relationships out of:
  a relationship between a function necessary for a process of the job and functions of first and second processing machines,
  a relationship between the functions of the first and second processing machines,
  a relationship between use of the first processing machine and use of the second processing machine,
  a process order of functions performed by the first and second processing machines, and
  a relationship between the process order of the first and second processing machines and a process order in which usage is to be prohibited;
decide a handling process at a time of a prohibition violation based on the process rule data set by the user; and
control, when a determination result of the prohibition process indicates the prohibition violation, a process of the job according to the decided handling process, wherein
the handling process is decided for each prohibition violation based on the process rule data in which a type of the prohibition violation and the handling process at a time of the prohibition violation are set in association with each other,
when a prohibition violation of a used device or a used function occurs and the process rule data set by the user includes a user-defined handling process, an operation control condition in a processing step of the job is updated according to the user-defined handling process and a process of the job is restarted according to the user-defined handling process, and
when the prohibition violation of the used device or the used function occurs and the process rule data does not include the user-defined handling process, the operation control condition in the processing step of the job is updated by a default value of the used device and/or the used function that performs the process of the job, and the process of the job is restarted, according to the decided handling process.

5. An information processing apparatus, comprising:
a reception circuit that receives a job;
a user interface control circuit that controls display of a user interface and receives, via the user interface, a user input from a user to set process rule data
a prohibition processing circuit that performs a prohibition process on the job based on at least two different relationships out of:
  a relationship between a function necessary for a process of the job and functions of first and second processing machines,
  a relationship between the functions of the first and second processing machines,
  a relationship between use of the first processing machine and use of the second processing machine,
  a process order of functions performed by the first and second processing machines, and
  a relationship between the process order of the first and second processing machines and a process order in which usage is to be prohibited;
a process decision circuit that decides a handling process at a time of a prohibition violation based on the process rule data set by the user; and
a job-process control circuit that, when a determination result of the prohibition process indicates the prohibition violation, controls a process of the job according to the handling process decided by the process decision circuit, wherein
the process decision circuit decides the handling process for each prohibition violation based on the process rule data in which a type of the prohibition violation and the handling process at a time of the prohibition violation are set in association with each other,
the job-process control circuit automatically updates, when an inter-function prohibition violation occurs and the process rule data set by the user includes a user-defined handling process, an operation control condition in a processing step of the job according to the user-defined handling process and automatically restarts a process of the job according to the user-defined handling process, and
the job-process control circuit automatically updates, when the inter-function prohibition violation occurs and the process rule data does not include the user-defined handling process, the operation control condition in the processing step of the job by a control value that is defined in advance in the process rule data, and automatically restarts the process of the job, according to the decided handling process.

6. An information processing apparatus, comprising:
a reception circuit that receives a job;
a user interface control circuit that controls display of a user interface and receives, via the user interface, a user input from a user to set process rule data;
a prohibition processing circuit that performs a prohibition process on the job based on at least two different relationships out of:
  a relationship between a function necessary for a process of the job and functions of first and second processing machines,
  a relationship between the functions of the first and second processing machines,
  a relationship between use of the first processing machine and use of the second processing machine, a process order of functions performed by the first and second processing machines, and a relationship between the process order of the first and second processing machines and a process order in which usage is to be prohibited;

a process decision circuit that decides a handling process at a time of a prohibition violation based on the process rule data set by the user; and a job-process control circuit that, when a determination result of the prohibition process indicates the prohibition violation, controls a process of the job according to the handling process decided by the process decision circuit, wherein the process decision circuit decides the handling process for each prohibition violation based on the process rule data in which a type of the prohibition violation and the handling process at a time of the prohibition violation are set in association with each other, and when a prohibition violation of the process order occurs, the job-process control circuit discards data of the received job and cancels the job according to the decided handling process.

* * * * *